June 20, 1933. A. F. MASURY 1,914,444
RADIUS ROD MOUNTING
Filed April 17, 1931
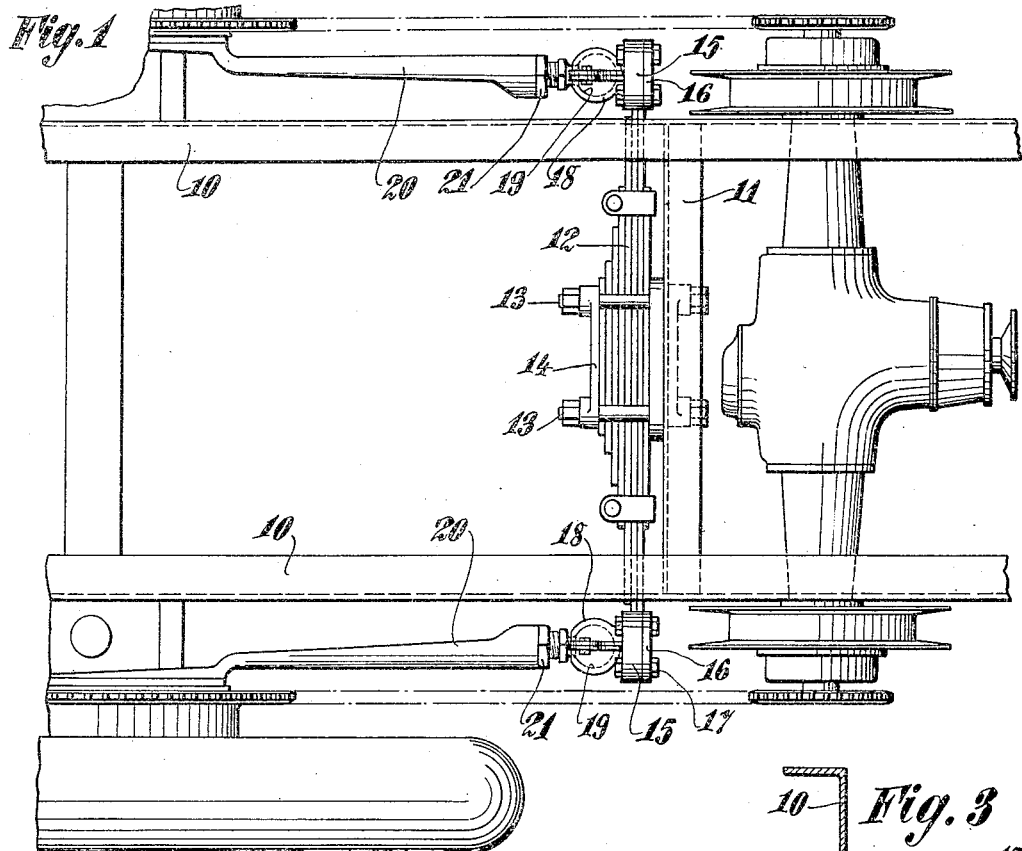
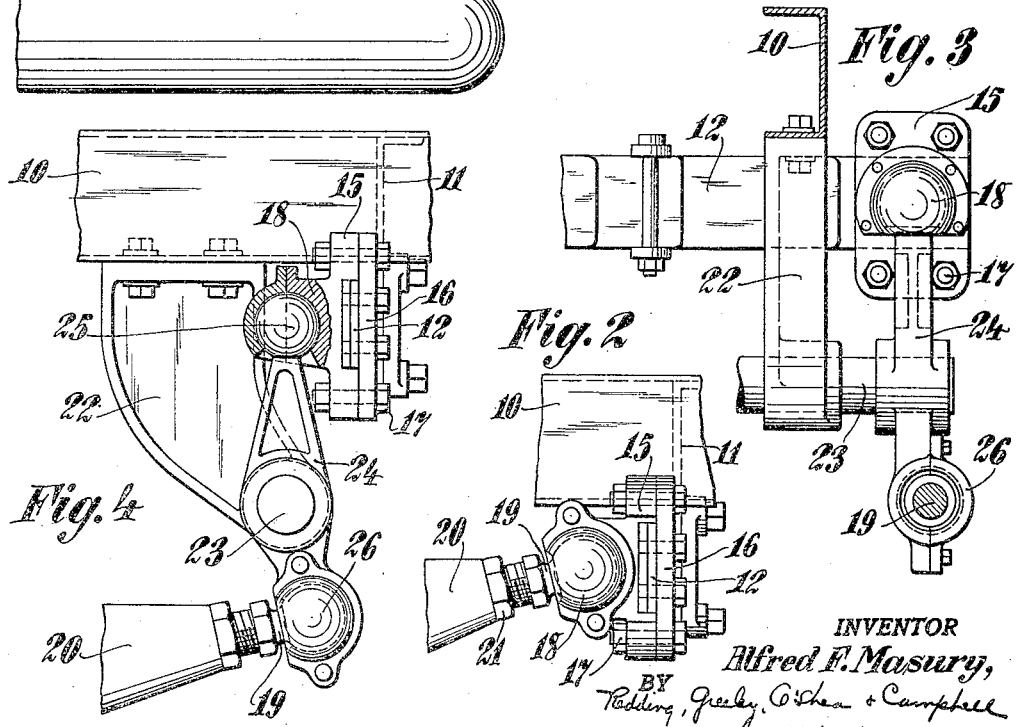
INVENTOR
Alfred F. Masury,
HIS ATTORNEYS Patented June 20, 1933

1,914,444

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

RADIUS ROD MOUNTING

Application filed April 17, 1931. Serial No. 530,779.

The present invention relates to radius rod constructions for motor vehicles and embodies, more specifically, an improved radius rod connection wherein a degree of yielding is afforded to cushion the forces transmitted to the vehicle frame through such rods.

In certain previously designed constructions of this character provision has been made for a degree of movement between the axle and frame in the direction of the radius rod, such movement being accommodated by means of various devices, such as blocks of rubber, springs, etc., and it is the purpose of the present invention to provide an improved mechanism of this character wherein the connection of the radius rod is of such character as to be inexpensively manufactured and assembled at the same time affording an effective connection between the radius rods and frame. It is further proposed to provide a connection of this character wherein the elements are so articulated as to be readily accessible for inspection and repair, thus facilitating the assembly of the units and proper servicing thereof. In combination with the foregoing features, it is a further object of the invention to provide a yielding connection of the above character, wherein the stresses transmitted to the frame from the driving members are effectively cushioned by means of a transverse spring which is carried by the vehicle frame intermediate the sides thereof.

In addition to the foregoing, further objects and advantages of the invention will appear as it is described in further detail in connection with the accompanying drawing, wherein:

Figure 1 is a plan view showing a portion of a vehicle frame including two radius rods and means for connecting the same to the frame in accordance with the present invention.

Figure 2 is a view in side elevation showing the manner in which the radius rod is connected to the yielding element in Figure 1.

Figure 3 is a view in rear elevation, showing a modified form of connection of the radius rod to the yielding element.

Figure 4 is a view in side elevation showing the connection of Figure 3.

Referring to the above drawing, a vehicle frame is indicated at 10 and is shown as provided with a transverse frame member 11 upon which a leaf spring 12 is secured by means of bolts 13 and plate 14. Although the spring may lie within the frame members 10, it is shown as being of sufficient length to cause the ends thereof to extend beyond the sides of the frame and such ends are provided with mounting brackets 15 which are clamped to the spring ends by means of plates 16 and bolts 17, the brackets being formed with ball sockets 18 within which the ball ends 19 of radius rods 20 are received. The ball ends may be extended to any desired position and are locked in place by means of nuts 21 in the usual manner.

In the construction shown in Figures 3 and 4, brackets 22 are mounted upon the frame members 10 and carry pivot shafts 23 upon which levers 24 are journaled. The arms of levers 24 are proportioned in such fashion as to bring the torque exerted upon the spring ends within desired limits and in the form shown, the upper arms of the levers are formed with ball ends 25 which are received within the ball sockets 18 of the brackets 15.

The shorter or lower arms of the levers 24 are formed with ball sockets 26 which receive the ball ends 19 of the radius rods, this construction being readily apparent from an inspection of Figures 2 and 3.

It will thus be seen that the torque may be applied directly to the ends of the spring 12 or it may be multiplied or divided in any suitable fashion by means of levers 24 to provide the desired torque ratios and the resulting construction is simple and inexpensive being adapted to be applied to any type of vehicle and thus easily manufactured and serviced.

While the invention has been described with specific reference to the accompanying drawing, it is not to be limited, save as defined in the appended claim.

I claim as my invention:

In combination with a vehicle frame and radius rods upon opposite sides thereof, a cross frame member, a single horizontal two-way spring member mounted intermediate its ends on the member and extending beyond the sides of the frame, brackets secured to the ends of the spring, ball sockets carried by the brackets, brackets secured to the frame at the sides thereof and journaling levers intermediate their ends, means to mount one end of the levers in the ball sockets on the first brackets, and means to journal the other ends of the levers on the radius rods.

This specification signed this 9th day of April A. D. 1931.

ALFRED F. MASURY.